United States Patent
Hernandez Lopez et al.

(10) Patent No.: US 10,252,632 B2
(45) Date of Patent: Apr. 9, 2019

(54) SYSTEM FOR SUPPLYING AND EXCHANGING A BATTERY BANK IN AN ELECTRIC VEHICLE FOR COMMERCIAL USE

(71) Applicant: Grupo Bimbo, S. A. B. de C. V., Mexico (MX)

(72) Inventors: Luis Angel Hernandez Lopez, Mexico (MX); Hugo Pichardo Anaya, Mexico (MX); Jose De Jesus Hernandez Jimenez, Mexico (MX); Leonardo Daniel Ortega Nolasco, Mexico (MX); Arturo Martinez Dorantes, Mexico (MX); Jorge Alejandro Garcia Mendez, Mexico (MX); Carlos Nava Ortiz, Mexico (MX)

(73) Assignee: GRUPO BIMBO, S.A.B. DE C.V., Mexico (MX)

( * ) Notice: Subject to any disclaimer, the term of this patent is extended or adjusted under 35 U.S.C. 154(b) by 0 days.

(21) Appl. No.: 15/767,567

(22) PCT Filed: Sep. 21, 2016

(86) PCT No.: PCT/IB2016/055642
§ 371 (c)(1),
(2) Date: Aug. 9, 2018

(87) PCT Pub. No.: WO2017/064582
PCT Pub. Date: Apr. 20, 2017

(65) Prior Publication Data
US 2018/0345805 A1 Dec. 6, 2018

(30) Foreign Application Priority Data
Oct. 15, 2015 (MX) .................... MX/a/2015/014520

(51) Int. Cl.
*B60K 1/00* (2006.01)
*B60L 15/20* (2006.01)
(Continued)

(52) U.S. Cl.
CPC ............ *B60L 11/1822* (2013.01); *B60K 1/00* (2013.01); *B60K 1/04* (2013.01); *B60K 37/02* (2013.01);
(Continued)

(58) Field of Classification Search
CPC ...... B66F 9/0754; B60S 5/06; B60L 11/1822; B60L 11/1877; B60K 1/04
See application file for complete search history.

(56) References Cited

U.S. PATENT DOCUMENTS

| 385,097 | A | * | 6/1888 | Condict | .............. | B60L 11/1822 105/51 |
| 7,872,449 | B2 | * | 1/2011 | Gutlein | .............. | G01R 31/3662 318/139 |

(Continued)

FOREIGN PATENT DOCUMENTS

| CN | 103010176 A | 4/2013 |
| CN | 203439506 U | 2/2014 |

(Continued)

OTHER PUBLICATIONS

International Search Report dated Feb. 7, 2017 in International Application No. PCT/IB2016/055642 (English and Spanish languages) (7 pages).

(Continued)

*Primary Examiner* — Bryan A Evans
(74) *Attorney, Agent, or Firm* — Brinks Gilson & Lione

(57) ABSTRACT

The present invention refers to a battery bank supply and replacement system in an electric vehicle, particularly for an electric vehicle used for the distribution of commercial (Continued)

goods. The system of the present invention comprises a battery bank mounted in a metal structure that is structurally coupled to a metal mounting structure arranged on the electric vehicle and a handling device consisting of a movable base. The movable base is aligned and secured to the metal mounting structure of the vehicle for removal of the battery bank from the vehicle towards the handling device or the other way round.

32 Claims, 11 Drawing Sheets

(51) Int. Cl.
    *B60S 5/06*     (2019.01)
    *B60L 11/18*     (2006.01)
    *B60K 1/04*     (2019.01)
    *B60K 37/02*     (2006.01)
    *B60L 3/00*     (2019.01)

(52) U.S. Cl.
    CPC ............. *B60L 3/0023* (2013.01); *B60L 15/20* (2013.01); *B60S 5/06* (2013.01); *B60K 2001/0416* (2013.01); *B60K 2001/0455* (2013.01); *B60K 2350/1072* (2013.01)

(56) References Cited

U.S. PATENT DOCUMENTS 9,850,114 B2 * 12/2017 Gilland ................. B66F 9/0754
2005/0008465 A1    1/2005 Szymanski

FOREIGN PATENT DOCUMENTS

FR    2 828 858 A1    2/2003
GB    2 455 200 A    6/2009

OTHER PUBLICATIONS

Written Opinion of the International Searching Authority dated Feb. 2, 2017 in International Application No. PCT/IB2016/055642 (Spanish language only—no translation available) (5 pages).

* cited by examiner

SYSTEM FOR SUPPLYING AND EXCHANGING A BATTERY BANK IN AN ELECTRIC VEHICLE FOR COMMERCIAL USE

FIELD OF THE INVENTION

The present invention refers to a battery bank supply and replacement system in an electric vehicle, particularly in an electric vehicle used for distribution of commercial goods. The system of the present invention facilitates the supply, replacement and transportation of the battery bank to the electric vehicle, which provides a considerable reduction of standby time when replacing one or all batteries in case of damage or for maintenance and general servicing of the battery bank.

BACKGROUND OF THE INVENTION

In the field of automotive industry, especially in the area concerned with the development of electric vehicles, different devices, methods and systems for recharging the battery bank of electric vehicles have been developed. There has also been an investigation into more efficient energy consumption in order to provide enhanced autonomy to the vehicle. However, it is beyond doubt that every electric vehicle requires a time to recharge the energy of the battery bank, the main disadvantage being that said time is much longer compared to the time to recharge fuel in an internal combustion car.

The big automotive brands have tried to reduce this time by opting for systems which allow recharging batteries in four hours instead of eight. Consequently, the cost of recharging equipment plus the cost of batteries, which must comply with the technical specifications required by the recharging device, must be added to the value of an electric vehicle.

If an electric vehicle is plugged directly to a 110 VAC electrical outlet, the on-board chargers are fed alternating current (AC), convert it to direct current (DC) and regulate the power that is being supplied to the battery bank. However, in case a fast charging or supercharging is used, the on-board charger and the conversion from AC to DC takes place outside the vehicle. A challenge for fast charging is that when a battery is supplied with energy very quickly, it experiences wear, which shortens its life. Therefore, in order to avoid damaging the battery, the external charger has to communicate adequately with the electronic components tracking the battery condition, including its voltage and temperature, to adjust the fast charging rates accordingly. To achieve this manner of charging, the charger has to be adequately designed to work in perfect synchrony with the measured parameters of the battery condition.

In order to achieve charging times of less than twenty minutes, it is necessary not only to further improve the charging system, but also to improve the interface with the electrical grid, due to the fact that power points that support loads of 120 kilowatts are required. Therefore, extracting large amounts of power from the grid implies costs associated with power demand on the electric power company, which further increases the price of the charging system.

In this regard, the Chinese patent application CN104333108 describes an emergency electrical charging system for an electric vehicle. The system comprises a diesel generator, an integrated AC-DC fast-charging device, a storage battery mounted in the vehicle, an electrical supply and an electric vehicle. The integrated fast-slow charging device comprises an AC-DC rectifier and voltage regulator module, an inverter module and a secondary voltage regulator module. The diesel generator and the power supply are connected to the rectifier and regulator module. The storage battery output port is mounted on the vehicle. The rectifier and voltage regulator module are connected to the end of the input port of the storage battery mounted in the vehicle. The output end of the rectifier and voltage regulator module is connected to the input end of the inverter module. The output end of the storage battery mounted in the vehicle is connected to the respective input ports of the inverter module and the secondary voltage regulator module. The inverter module and the secondary voltage regulator module are connected to the electric vehicle, when the electric vehicle is inactive, the power supply is connected to fully charge the storage battery mounted in the vehicle, and when the electric vehicle is in a charging state, the diesel engine alone charges the battery mounted in the vehicle. However, said emergency electrical charging system has the disadvantage of requiring another energy generating source that is powered by diesel fuel.

Japanese patent application JP2014204549 describes a power supply system accompanied by a method for charging an auxiliary battery of the main battery by means of a charge control device during the time in which the electric vehicle is parked or inactive. In this invention, the system includes: a solar panel, a solar charger and a section for detecting solar electrical charging energy. The solar panel is attached to an exterior panel of a vehicle, for example a roof panel. The solar charger charges the auxiliary battery with the electrical power generated by the solar panel. The section for detecting solar electrical charging energy detects the amount of charge in the auxiliary battery, according to the amount of energy of the auxiliary battery charged by the solar charger, where an integration electronic control unit (ECU) controls and adjusts the time to complete charging in order to start charging. However, the invention described would be insufficient to recharge a battery bank via solar panel; in order to do it, a solar panel system that supplies the amount of energy required to recharge the battery bank of the electric vehicle is necessary.

Japanese patent application JP2014183713 discloses a battery recharging device for charging an accessory battery, with adequate electrical power during a parking period. An accessory battery of the charging system performs a first charging in order to charge an accessory battery at each predetermined time, for example, while the electric power source of the vehicle is off, and a second charging for supplying electrical power to the accessory battery. Meanwhile, a replacement device or communication device of the vehicle has carried out the communication while the power source is off. The method for increasing the electrical power supply is exemplified by means of a method for increasing the charging time or a method for increasing the output voltage value of a DC-DC converter. Therefore, said invention has the disadvantage of being suitable only for recharging a single accessory battery at times when the vehicle is parked, which lacks the capacity to charge the battery bank of an electric vehicle.

The US patent application US2014203077 describes a charging system for the battery for an electric vehicle, wherein an RFID tag, an RFID receiver, an electrical charger and a controller operate to charge the battery of an electric vehicle according to a user profile and a charging profile in response to a signal from the RFID tag received by the RFID reader. In an interconnected system, multiple charging stations are connected to the power grid and communicate with a central controller through communication links. A grid converter can be provided to allow recharging the energy of the electric vehicle from the electrical grid in response to a command from the central controller. Therefore, said invention requires an additional investment for the charging stations infrastructure as well as relevant adjustments to the electrical grid in order to supply the charging stations, which represents an overall disadvantage for the usage of electric vehicles.

Japanese patent application JP2014108031 describes a charge/discharge control device, which controls charge/discharge of a power storage device provided with a first power storage unit having a relatively high energy density and a second power storage unit having a relatively low energy density, includes: a determination unit which detects charging/discharging power values in the first power storage unit and the second power storage unit, a power consumption value consumed by a load, and a charging power value supplied from a generator and outputs a charge/discharge control signal based on these detected values; a first charging/discharging unit for charging/discharging the first power storage unit on the basis of the charge/discharge control signal; and a second charging/discharging unit for charging/discharging the second power storage unit on the basis of the charge/discharge control signal. Power to be charged/discharged to/from the first power storage unit and the second power storage unit is determined in accordance with power supplied from the generator to the power storage device and power supplied from the power storage device to the load. The above represents additional costs associated with using high energy density batteries, as well as specific electric/electronic devices for recharging the same.

The inventions mentioned above, applied to the automotive industry in the field of electric vehicles, in particular require the users to invest an additional capital to equip their electric vehicle with a system or equipment for fast recharging of the vehicle battery bank that prevents long standby times when recharging the battery bank.

Therefore, electric vehicles are not fully acceptable to users mainly because of the high cost of such vehicles, the autonomy and the long time required to recharge the battery bank if there is no adequate electrical equipment for fast charging of the battery bank. Vehicle users are accustomed to having their vehicles available for use almost all the time, and there are even economic sectors in which the availability of the vehicle is a paramount need.

However, in order to avoid such long battery bank recharging times, not only is a special equipment needed for quick recharging of the battery bank, it is also necessary for the electrical infrastructure to support the high amounts of current required for its operation. Despite the fact that electrical power is available everywhere, in order to achieve fast recharges of the battery bank, capacity of the electrical grid and adequate electrical equipment to achieve said purpose are necessary.

The present invention provides a solution to this problem, especially applied to electric vehicles used in the distribution of commercial products, where the standby time while recharging the battery bank is an undesirable factor and the option to quickly recharge the batteries is not feasible due to the vehicle batteries being quickly damaged or the economic costs involved.

Given the prior art, there is a need to provide a system that allows easy replacement or exchange of the entire low-charge-level battery bank by another battery bank having an optimum charge level for the operation of the electric vehicle, without the need to wait for the battery bank of the vehicle to be fully charged in order to use the vehicle again.

The present invention does not require a special infrastructure for the fast recharging of batteries nor the investment that making the corresponding adjustments to the electric network, installing the recharging stations, periodic maintenance, and energy consumption rates entail.

Those skilled in the art know the need for a system that allows the battery bank of an electric vehicle to be mounted and removed in the shortest amount of time possible and replaced with another previously charged battery bank and for a solution to the eight-hour recharging times of the vehicle battery bank, considering that in the economic sector where the vehicle is used, the time factor is paramount for the company or business.

The present invention allows an efficient programming in the distribution routes that the electric vehicle(s) must comply with, considering the performance of the battery bank charge and the autonomy of the electric vehicle plus the estimated time for the replacement of the battery bank. Therefore, the vehicle user or the company does not require special equipment or expensive infrastructure to optimize the recharging time of the battery bank.

OBJECTS OF THE INVENTION

According to the present invention, its main objective is to provide a battery bank supply and replacement system in an electric vehicle, which removes the recharging time of the electric vehicle battery bank for it to continue with its operation.

A second objective of the present invention is to provide an electric vehicle for commercial use that has a range of 80-100 km (for every electrical recharging of batteries) with a maximum load capacity of 1000 kg.

A third objective herein is to provide a system for exchanging or replacing the battery bank in an electric vehicle that facilitates handling of the previously charged battery bank towards said vehicle.

A fourth objective of the present invention is to provide an electric vehicle for commercial use, comprising means and connections that allow removing and/or replacing the battery bank for another, previously charged battery bank, in the shortest amount of time possible for the electric vehicle to continue operating.

The present invention seeks to provide a battery bank exchange or replacement system in an electric vehicle, which overcomes and/or substantially solves the problems associated with the battery recharging time of an electric vehicle.

Therefore, the embodiments of the invention comprise a combination of features and advantages that substantially improve the battery bank supply and replacement system in an electric vehicle. These and many other features and advantages of the invention will be readily apparent to those skilled in the art upon reading the following detailed description of the invention, with reference to the accompanying drawings.

BRIEF DESCRIPTION OF THE INVENTION

In general, the main aspect of the present invention refers to a battery bank supply and replacement system of an electric vehicle for commercial use, comprising a rail structure mounted at the rear of the vehicle cabin. The purpose is for the power source of the electric vehicle to be closest to the motor and control of the vehicle, avoiding energy losses in the electrical conductors, which becomes important for the autonomy of the electric vehicle.

The electric vehicle for commercial use includes an electronic control system that improves the autonomy of the vehicle by means of a control logic, which allows more efficient performance of the electrical charging of the electric vehicle battery bank, based on the monitoring and management of detected data related to the operation of the vehicle, such as: battery bank voltage, current consumed, motor temperature, handbrake signal, open door signal, cargo gate signal, activation of the vacuum pump for soft and safe braking. Through said data, the electronic control device of the electric vehicle optimizes the excessive or inadequate current consumption, for example, if the electronic control system detects the handbrake has been activated for a previously established duration, the electric vehicle electronic control device will issue an alert to the dashboard in order to subsequently send a command regarding a control signal to prevent the vehicle from moving.

The preferred embodiment of the battery bank supply and replacement system of the vehicle for commercial use of the present invention comprises a battery bank composed of eight lead acid batteries connected in series to 24 batteries connected in series-parallel; which integrate a voltage of 96 V. Said battery bank is assembled in a metallic base structure that is structurally coupled to the metal mounting structure mounted on the electric vehicle, in such a way that the battery bank slides on a series of wheels of the metal mounting structure up to a stop and interlocks such that the battery bank is maintained fixed, protected against unwanted vibrations or displacement.

Additionally, the battery bank supply and replacement system in the electric vehicle for commercial use of the present invention comprises a handling device consisting of a movable metal base which has the same dimensions and structural technical properties as the metal mounting structure of the electric vehicle, such that the movable base is aligned and secured to said rails for removal of the battery bank from the vehicle towards the handling device or vice versa.

In one embodiment, the handling device comprises mechanical and control means for adjusting the height of the movable base and correctly aligning with the metal mounting structure installed in the electric vehicle.

Therefore, other aspects, objects, functions and modalities will be apparent from the following description and the appended claims.

BRIEF DESCRIPTION OF THE DRAWINGS

In order to facilitate understanding of the detailed description of the invention, reference will now be made to the accompanying drawings.

DETAILED DESCRIPTION OF THE PREFERRED EMBODIMENTS

In the area of transportation and distribution of commercial goods it is of the utmost importance that the vehicle complies with certain scheduled routes throughout the day; where the time factor is paramount for compliance with these routes. Employing electric vehicles for this purpose offers important advantages over using vehicles with internal combustion engine. One of the main advantages in the use of electric vehicles is the monetary savings for not using gasoline. However, electric vehicles require a time to recharge the battery bank which is their source of energy, said time ranges from eight to sixteen hours. In electric vehicles for commercial use, the battery recharging time is a factor that limits the use of said vehicle, so a system is necessary that allows the replacement of the entire battery bank with a previously charged battery bank as the best alternative to reduce said standby times in which the electric vehicle would remain inactive.

The present invention seeks to solve said problem, as well as to prevent the user or the company owning the electric vehicle(s) from investing in electric/electronic equipment, recharging stations and special batteries that allow to decrease the recharging time of said batteries, which are considerable investments and monetary expenditures; together with the preventive and corrective maintenance required by said equipment and system.

The system of the present invention expedites the supply, as well as the replacement of the electric vehicle battery bank, reducing the period in which the vehicle remains inactive due to the recharging of the battery bank energy.

Figure 1:
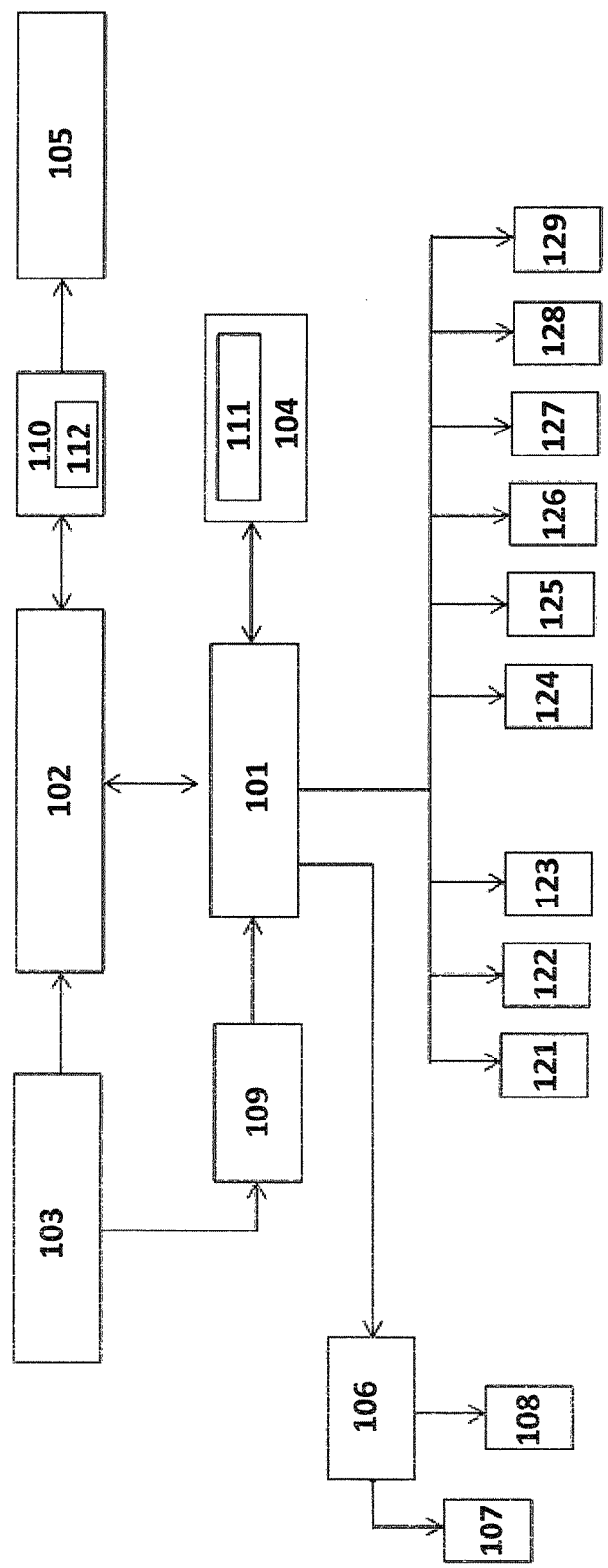
FIG. 1 shows a block diagram of the elements comprising the electric vehicle of the present invention.

According to FIG. 1, there is illustrated a block diagram of the elements comprising the electric vehicle of the present invention, which comprises primarily an electronic control device (101) having a separate high efficiency switched-mode power supply that decreases the current consumption by peripheral circuits and control elements such as contactors (not shown) and a dashboard (104), in addition to generating savings by optimizing the lifetime of the control contactors and the batteries that make up a battery bank (103). Particularly, the electronic control device (101) manages and communicates detected variable data, such as: battery bank (103) voltage via a voltage sensor (124); current consumption of said battery bank (103) based on the data collected through a current sensor (125); motor (105) temperature based on the data collected by a temperature sensor (126); acceleration variables via sensors (127 and 128) and activation of a vacuum pump (107) for a smooth and safe braking of the electric vehicle via a vacuum sensor (129).

Additionally, the electronic control device (101) governs the on and off variables of the electric vehicle as well as an acceleration system (110) of the electric motor (105), the former via a controller (102), so that the electronic control device (101) administers and communicates detected variables of events occurring during the operation of the electric vehicle of the present invention, in the events: of one of the cab doors being open, via a pair of mechanical switches (121) that are each arranged in the chassis of the electric vehicle to detect the state of the cab doors; of the cargo bay door being open, via a mechanical switch (122) which is mounted on the cargo bay of the vehicle to detect the state of the cargo cover; and of the handbrake being activated through the detected signal received from a mechanical switch (123) mounted on the handbrake lever mechanism.

The electric vehicle also has an entirely digital dashboard (104), operating in conjunction with the electronic control device (101) and the controller (102). The dashboard (104) comprises an odometer, instruments for measuring speed, motor temperature, the battery bank (103) charge level and a series of visual alarms (111), in addition to comprising an audible alarm. For example, these alarms serve to alert the vehicle operator in case of detecting excessive current consumption caused by: acceleration, incorrect speed handling, slopes with an inclination beyond the allowed value, higher than indicated load, activation of the handbrake, one or more doors being open, open cargo cover, among others.

It is important to mention that the communication of the dashboard (104) with the electronic control device (101) is carried out by means of an RS-232 communication bus.

On the other hand, the controller (102) has the function of converting 96 volts of direct current supplied by the battery bank (103) to a variable three-phase alternating current that supplies the electric motor (105). Therefore, the controller (102) manages and controls the electric motor operating variables such as: revolutions per minute, torque, limits of current consumption, motor acceleration and operation based on the detected motor temperature. In this way, the vehicle acceleration is achieved through an electronic acceleration module (112) that works mechanically in connection with the controller (102).

To recharge the batteries of the battery bank (103), the electric vehicle of the present invention further comprises a charger (109). Preferably, the charger (109) can be of the SCR type, and controls electronically the state of the batteries based on the current demand by means of equalization and float stage.

Additionally, the electric vehicle of the present invention comprises an auxiliary battery (106) for supplying all the cab systems, lights and the vacuum pump (107) that assists the vacuum servo booster of the braking system. Said systems are managed by the electronic control device (101) that assists and monitors the braking system by means of the vacuum sensor (129) detecting the vacuum generated in the tank or reservoir (FIG. 2, (118)). In addition, the electric vehicle comprises an inertial cut-off switch (116) that "opens" the circuit in the event of a collision, preventing the flow of energy to deactivate the operation of the electric vehicle of the present invention.

Figure 2:
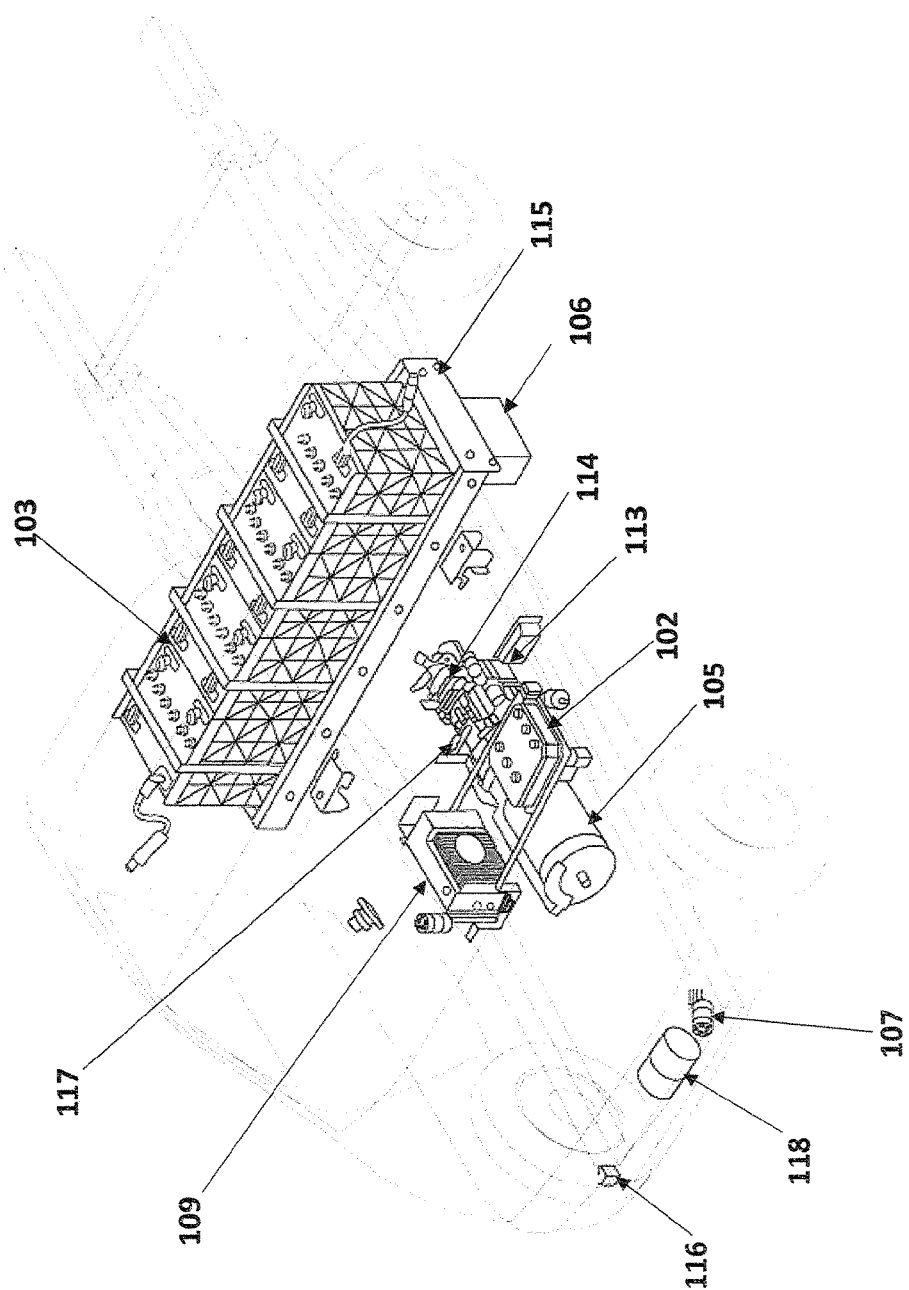
FIG. 2 shows a schematic perspective view of the electric vehicle of the present invention.

FIG. 2 shows a schematic perspective view of the electric vehicle of the present invention, wherein the electric motor (105) is preferably of the three-phase AC squirrel cage type, which is directly coupled to a gearbox (113) of the vehicle, preferably through a custom-made clutch; the gear changes being made with a gearshift (114). In one embodiment, the gearbox (113) of the vehicle is adjusted to a gear and via a selector button (117) it moves to forward, neutral or reverse, reversing the polarity of the motor. When the selector button (117) is in the neutral position, it sends information to the electronic control device (101) so that the vehicle does not move even if the accelerator pedal is pressed or all the safety conditions have been met. In the event that the selector button (117) is pressed to forward, a signal is sent to the electronic control device (101) so that the truck can move forward, and the motor rotation is constantly monitored to ensure the motor does not change direction until it has come to a complete stop, the rpm is 0 and the selector button has been pressed to reverse. Additionally, it is ensured that the motor is fully at rest in order for this signal to be sent to the electronic control device (101), so that the vehicle can move in reverse. The former also applies the other way round, that is, if the vehicle is in reverse and the selector button is pressed to move forward, it waits until the rpm is zero and then changes the polarity, so it always checks the movement of the motor in order to only make a change the rotation when the motor has stopped completely.

The battery bank (103) is composed of at least eight lead acid batteries connected in series which form a voltage of 96 volts. The battery bank (103) is mounted on a metallic mounting structure (115) that is fastened to the chassis of the electric vehicle, just behind the cab through fastening means which can preferably be screws, rivets, among others, without being limited to said means.

The metallic mounting structure (115) is composed of a pair of side rails which are the means whereon the structure of the battery bank (103) slides and engages, in such a way that the battery bank (103) interlocks with the metal mounting structure (115), becoming mechanically coupled to it and remaining seated without unwanted vibrations or displacement.

Figure 3:
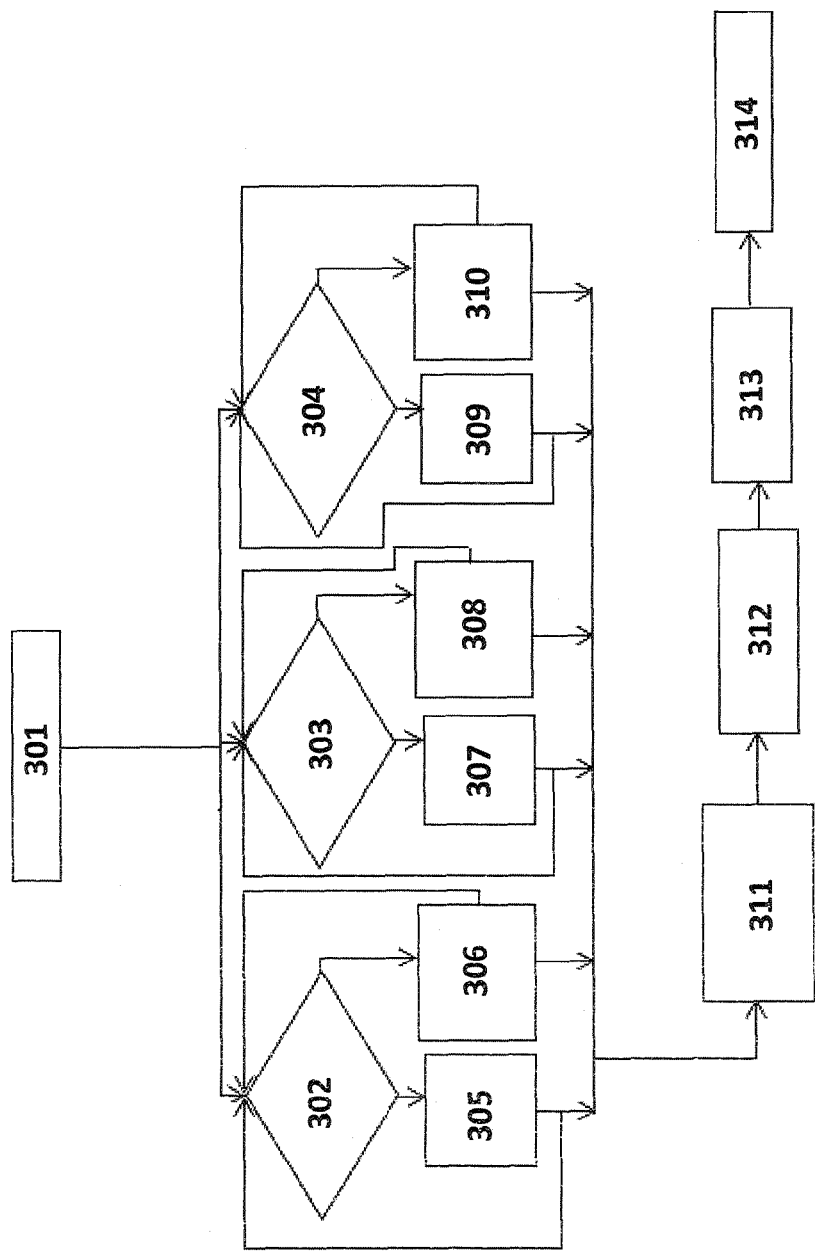
FIG. 3 shows the flow chart of the control and operation algorithm methodology of the electronic control device.

FIG. 3 shows the flow diagram of the control and operation algorithm methodology of the electronic control device, which controls the on and off variables of the electric vehicle upon the detection of an alarm event. Once the electric vehicle of the present invention has been started (301), from the activation of the ignition switch signal by the operator until the vehicle is ready to advance, and if, while the electric vehicle is on route or operating, the electronic control device detects that any of the vehicle doors is open, where one of the mechanical switches placed in each door of the vehicle detects said event (302); the electronic control device sends a corresponding signal to the dashboard to activate a visual signal (305) and alert the operator; if the operator corrects said event ensuring that the vehicle doors are properly closed, the electronic control device sends another corresponding signal to the dashboard to deactivate the visual signal (306). However, in case the operator ignores said alarm for a duration previously established in the control algorithm of the electronic control device, it activates a shutdown timer (311) and subsequently an overflow flag (312); once the previously established shutdown period has elapsed, the electronic control device sends a control signal to the vehicle ignition contactors to deactivate them, deactivating the operation of the electric vehicle (314) as a safety measure for the occupants of the vehicle.

If, while the electric vehicle of the present invention is on route or operating, the electronic control device detects that the vehicle cargo cover has been opened, where the mechanical switch is placed in the cargo bay detects said event (303), the electronic control device sends a corresponding signal to the dashboard to activate the corresponding visual signal (307) and alert the operator, assuming that the operator corrects said event ensuring that the cargo cover is properly closed, the electronic control device sends a corresponding signal to the dashboard to deactivate the visual alarm (308). However, in case the operator ignores said alarm for a duration previously established in the control algorithm of the electronic control device, it activates the shutdown timer (311) and subsequently the overflow flag (312). Once the previously established shutdown period has elapsed, the electronic control device sends a control signal deactivating the vehicle ignition contactors (313), which deactivates the operation of the electric vehicle (314) as a safety measure for the transported goods, and consequently, the vehicle does not move.

If the vehicle operator has activated the handbrake and subsequently started the vehicle without first deactivating the handbrake, or parks it without subsequently turning off the vehicle, the electronic control device detects said event. This detection is preferably carried out by a pressure switch arranged in the mechanism of the handbrake lever, wherein the switch senses said event (304) and the electronic control device sends a corresponding signal to the dashboard to activate a visual signal (309) to alert the driver, in the event that the operator deactivates the handbrake, the electronic control device sends a corresponding signal to the dashboard to deactivate the visual signal (310). However, in case the operator ignores said alarm for a duration previously established in the control algorithm of the electronic control device, the shutdown timer (311) and subsequently the overflow flag (312) are activated. Once the shutdown period has elapsed, the electronic control device sends a control signal deactivating the vehicle ignition contactors (313), which deactivates the operation of the electric vehicle (314) as a safety measure to prevent the vehicle from being damaged or as a energy saving measure in the event that the vehicle is parked.

Figure 4:
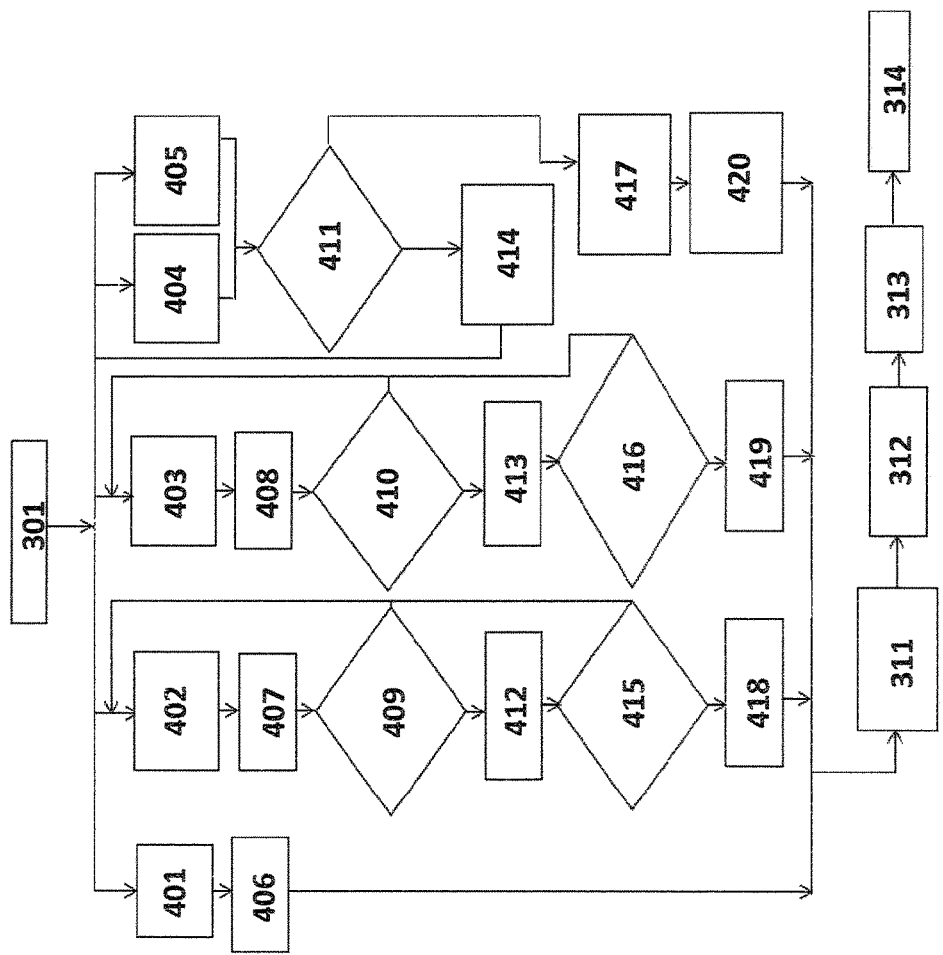
FIG. 4 shows another flow chart of the control and operation algorithm methodology of the electronic control device in case of detecting anomalies during the operation of the electric vehicle of the present invention.

FIG. 4 shows the flow chart of the control and operation algorithm methodology of the electronic control device in case of detecting anomalies during the operation of the electric vehicle of the present invention. Once the electric vehicle of the present invention has been started (301), from the activation of the ignition switch signal by the operator until the vehicle is ready to advance, and while the electric vehicle is on route or operating, the temperature sensor of the electric vehicle motor continuously sends the data corresponding to said reading (401) to the electronic control device for interpretation and processing, if said reading is not within the operating range of 0-140° C., the electronic control device sends a signal to the dashboard to activate a visual signal (406) to alert the vehicle operator that said event has occurred, for the operator to take precautionary measures and turn off the vehicle as soon as possible. In case the operator does not turn the vehicle off for a duration previously established in the control algorithm of the electronic control device, it activates the shutdown timer (311) and subsequently the overflow flag (312). Once the shutdown period has elapsed, the electronic control device sends a control signal deactivating the vehicle ignition contactors (313), which deactivates the operation of the electric vehicle (314) as a safety measure to prevent the electric vehicle motor from being damaged.

In the same way, while the vehicle is on route or operating, the battery bank voltage sensor of the electric vehicle continuously senses and sends signals corresponding to said reading (402) to the electronic control device, wherein the electronic control device sends a corresponding signal with said reading to the dashboard to be interpreted and displayed by means of a digital visual interface (407). If the reading of the battery bank voltage is within the range of 104-86V, the digital visual interface interprets that reading as a normal operating voltage (409) and activates a corresponding visual signal (412). If the reading of the battery bank voltage sensor of the electric vehicle is lower than the previously established range (415), the dashboard activates a corresponding visual alarm (418) to alert the operator of said event for the vehicle battery bank to be recharged. In case the operator does not carry out the corresponding precautionary measures and the sensor detects a greater voltage drop in the battery bank, the electronic control device activates the shutdown timer (311) and subsequently the overflow flag (312). Once the shutdown period has elapsed, the electronic control device sends a control signal deactivating the vehicle ignition contactors (313), which deactivates the operation of the electric vehicle (314) as a safety measure to prevent the electric vehicle from being damaged.

In the same way, the current sensor of the electric vehicle constantly sends data corresponding to said reading (403) to the electronic control device for interpretation and processing, wherein the electronic control device sends a signal corresponding to said reading to the dashboard to be displayed by means of a digital visual interface (408). If the reading of the current consumption controller is outside the range of 350 Amperes, said reading is displayed on the digital visual interface as a high current consumption alert (410) and a pulsating auditory signal (413) is activated at the same time. If the reading of the current sensor continues to increase, said reading is be presented on the digital visual interface as a high current consumption alert (416) and simultaneously a pulsating auditory signal switches to a constant auditory signal (419) to alert the operator of said event and for the corresponding precautionary measures to be taken, the measures being: driving at a correct speed, avoiding steep slopes inclined beyond the allowed value, the load not being greater than recommended, among others. However, in case the operator does not perform the corresponding precautionary measures, and the current sensor continues to detect a current consumption greater than previously established in the control algorithm of the electronic control device, it activates the shutdown timer (311) and subsequently the overflow flag (312). Once the shutdown period has elapsed, the electronic control device sends a control signal deactivating the vehicle ignition contactors (313), which deactivates the operation of the electric vehicle (314) as a safety measure to prevent the electric vehicle from being damaged.

Additionally, the accelerator reading sensors constantly send data corresponding to said reading (404 and 405) to the electronic control device for interpretation and processing, if said reading satisfies (411) the following function:

$$Sensor2 = Sensor1 - 1.5$$

the electronic control device interprets said reading as a normal acceleration operation of the electric vehicle (414). However, if said reading does not satisfy the previously mentioned function, the electronic control device sends a corresponding signal to the controller to deactivate the acceleration of the vehicle (417) and at the same time the electronic control device sends a corresponding signal to the dashboard to activate a visual signal and alert the operator of said event, and for the corresponding precautionary measures to be taken, such as avoiding undue acceleration. In case the operator ignores said warning signal, and the acceleration sensors 1 and 2 continue to detect a reading that does not satisfy the previously established function, the electronic control device activates the shutdown timer (311) and subsequently the overflow flag (312). Once the shutdown period has elapsed, the electronic control device sends a control signal deactivating the vehicle ignition contactors (313), which deactivates the operation of the electric vehicle (314) as a safety measure to avoid damaging the electric vehicle motor and high current consumption.

Figure 5:
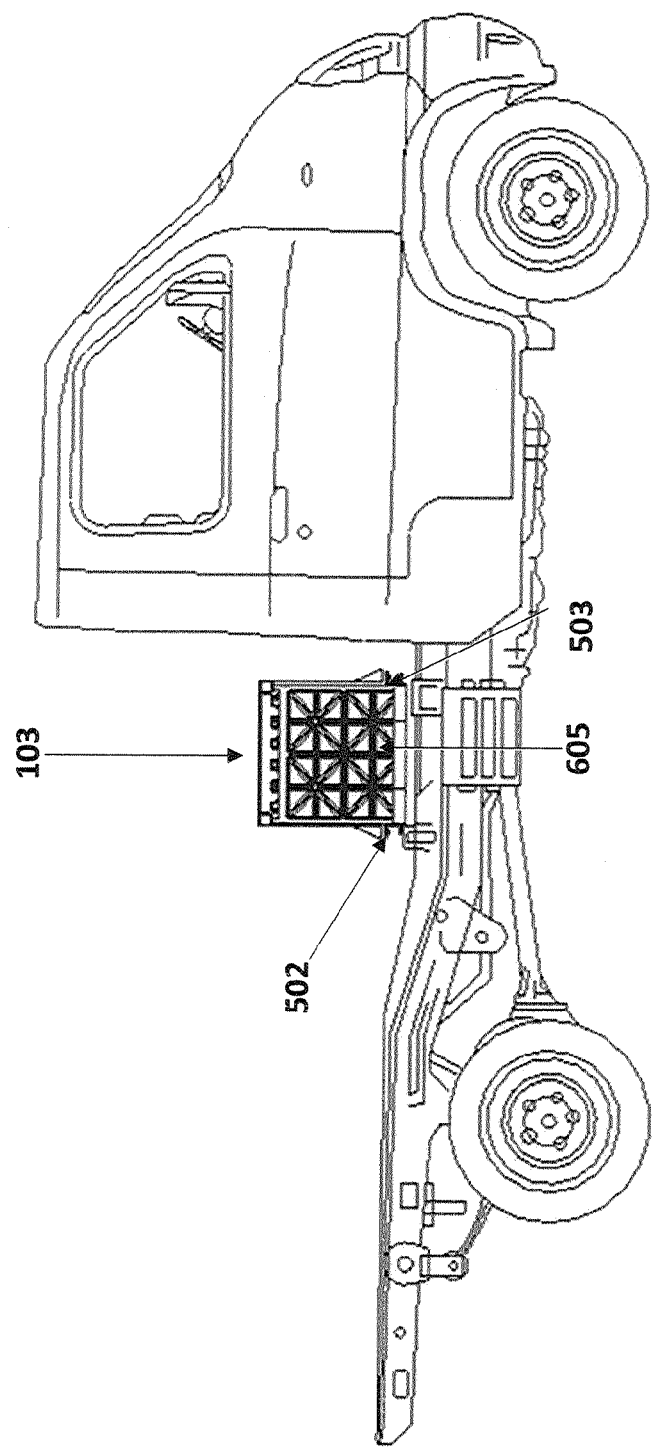
FIG. 5 shows a side view of the electric vehicle of the present invention.

FIG. 5 shows a side view of the electric vehicle of the present invention, wherein the battery bank (103) is depicted mounted on a supporting structure (605) which is part of the battery bank supply and replacement system in the electric vehicle. Said battery bank (103) is coupled to a metal mounting structure consisting of a left rail (502) and a right rail (503), wherein said rails are mounted at the rear of the cab by fastening means (not shown) that attach directly to the vehicle chassis.

Figure 6A:
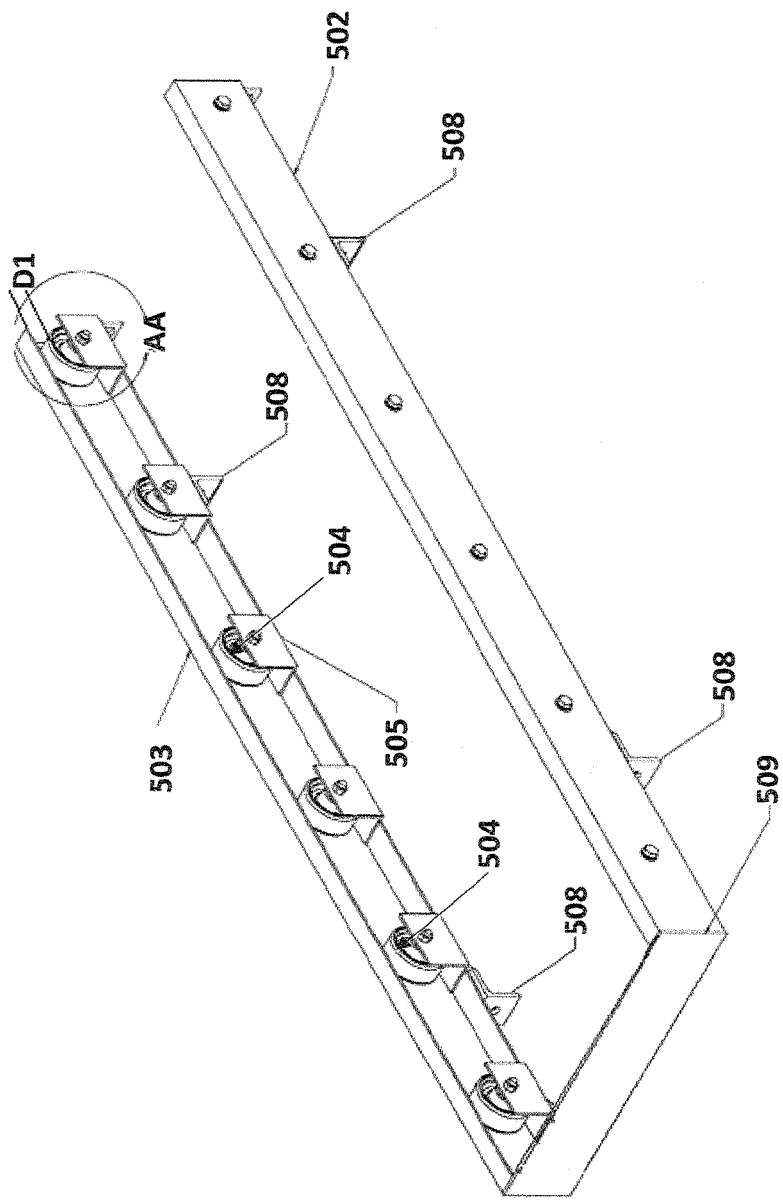
FIG. 6A shows a rear isometric perspective view of the metal mounting structure of the present invention.

FIG. 6A shows a rear isometric perspective view of the metal mounting structure comprising the left rail (502) and the right rail (503), wherein each rail comprises a series of wheels (504) attached to a wheel angle base (505) by fastening means. Each wheel angle base is attached to the inner bottom surface of each rail (502) and (503) by electric welding, preferably tungsten or micro wire, but not limited to one of these; forming an area whereon the supporting structure (603) of the battery bank slides, which is a space (D1) that extends between each of the wheels with the inner top surface on the left rail (502) and the inner top surface on the right rail (503). A stop (509) confines the distance between the left rail (502) and the right rail (503), in addition to limiting the sliding and engagement of the battery bank supporting structure (not shown) in the metal mounting structure (115). Additionally, each of the left (502) and right (503) rails comprises at least one pair of fastening means (508) which are attached or welded on the outer bottom surface of each rail to attach the metal mounting structure to the electric vehicle chassis.

Figure 6B:
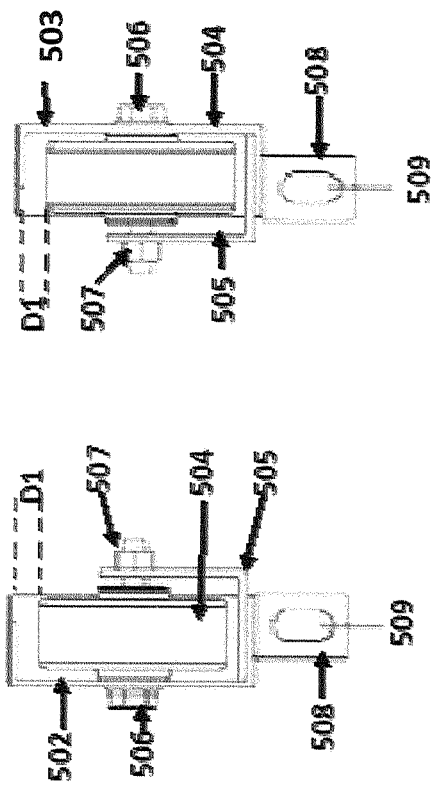
FIG. 6B is a front perspective view of the metal mounting structure that forms part of the supply and replacement system of the electric vehicle battery bank.

FIG. 6B illustrates a front perspective view of the metal mounting structure that forms part of the supply and replacement system of the electric vehicle battery bank. In said figure, the space (D1) extending between each of the wheels (504) with the inner top surface on the left rail (502) and with the inner top surface on the right rail (503) can be seen, it being the area where the metal structure of the battery bank interlocks and slides for engagement on the rails. Each wheel (504) is mounted on the respective rail (502) or (503) preferably by means of a screw (506) and a nut (507), wherein the screw (506) passes through the rail and the wheel angle base (505), which also serves as the axis of rotation for the respective wheel (504). Furthermore, in said figure one of the fastening means (508) for each of the left (502) and right rail (503) can be seen, wherein the fastening means (508) comprise at least one hole (509) for fastening the metal mounting structure to the electric vehicle chassis by means of a screw or any other fastening means serving said purpose.

Figure 6C:
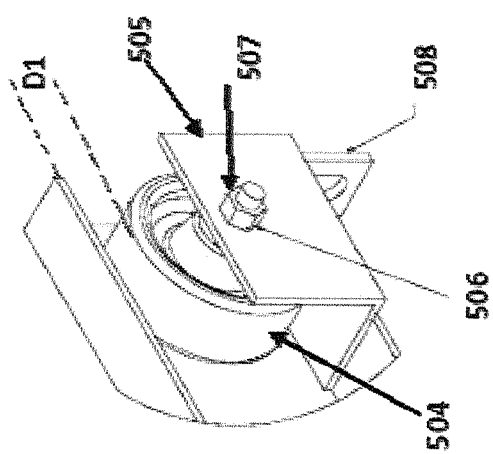
FIG. 6C is an enlarged side perspective view of the area AA depicted in FIG. 6.

FIG. 6C shows an enlarged view of the area AA indicated in FIG. 6A, which shows in detail the engagement of the wheel angle base (505) inside the rail, by means of which the wheel is mounted inside the rail by a screw (506) supported by a nut (507), which facilitates the maintenance and wheels replacement in case of wear or failure.

Figure 7:
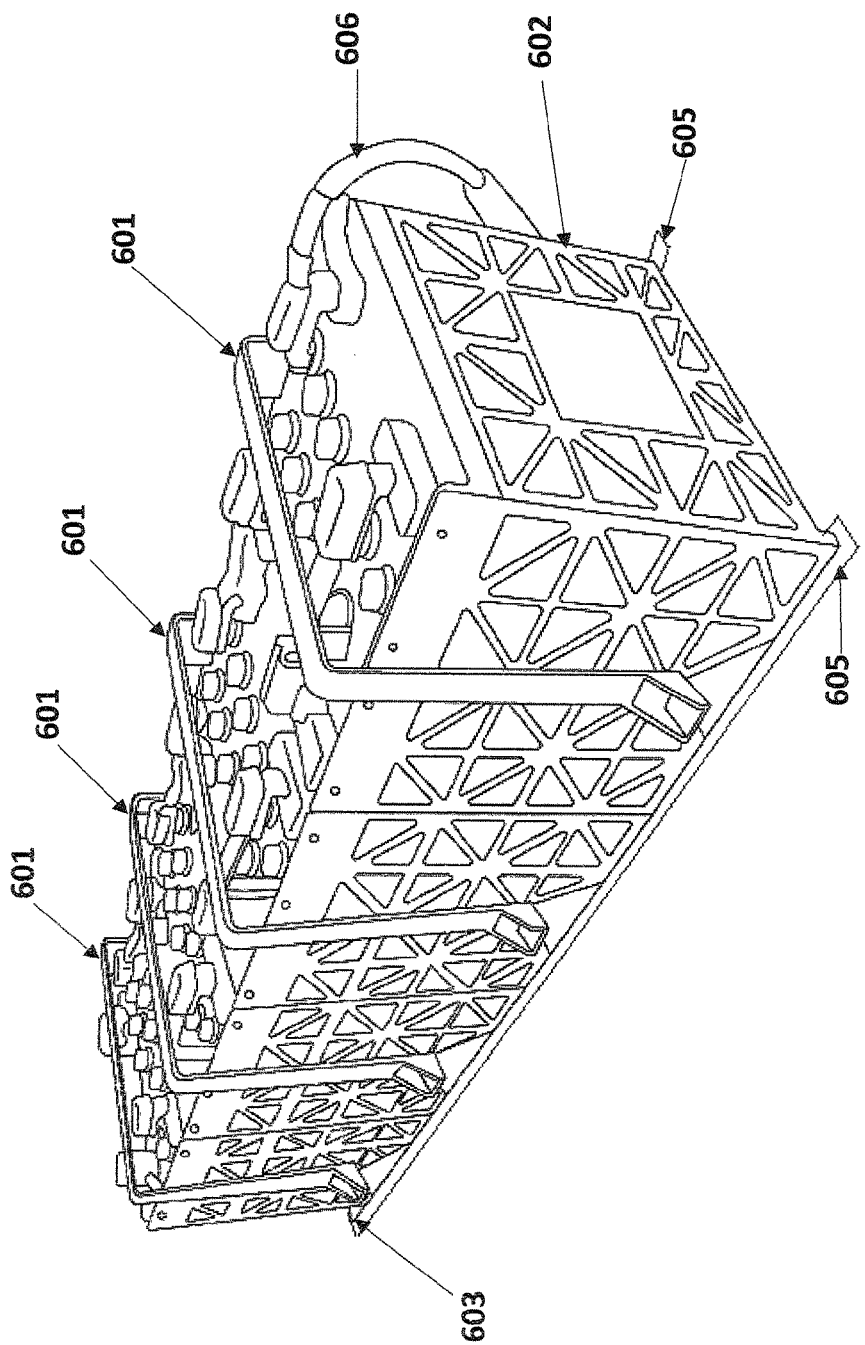
FIG. 7 shows an isometric perspective view of the removable battery bank that forms part of the supply and replacement system of the electric vehicle battery bank.

FIG. 7 shows an isometric perspective view of the removable battery bank that forms part of the supply and replacement system of the battery bank in the electric vehicle of the present invention. The removable battery bank consists of at least eight batteries (602) which are disposed on a supporting structure (603) and fastened to said structure by fastening means (601). The supporting structure (603) is sized according to the size and number of batteries, wherein said structure (603) comprises a pair of side flanges (605) which are inserted into the rails of the metal mounting structure (115) of the electric vehicle, for sliding and attachment, maintaining the removable battery bank (103) fixed on the electric vehicle without unwanted vibrations or displacement. The removable battery bank (103) further comprises a pair of connectors (606) to facilitate its connection or disconnection with the electrical system of the vehicle.

Figure 8:
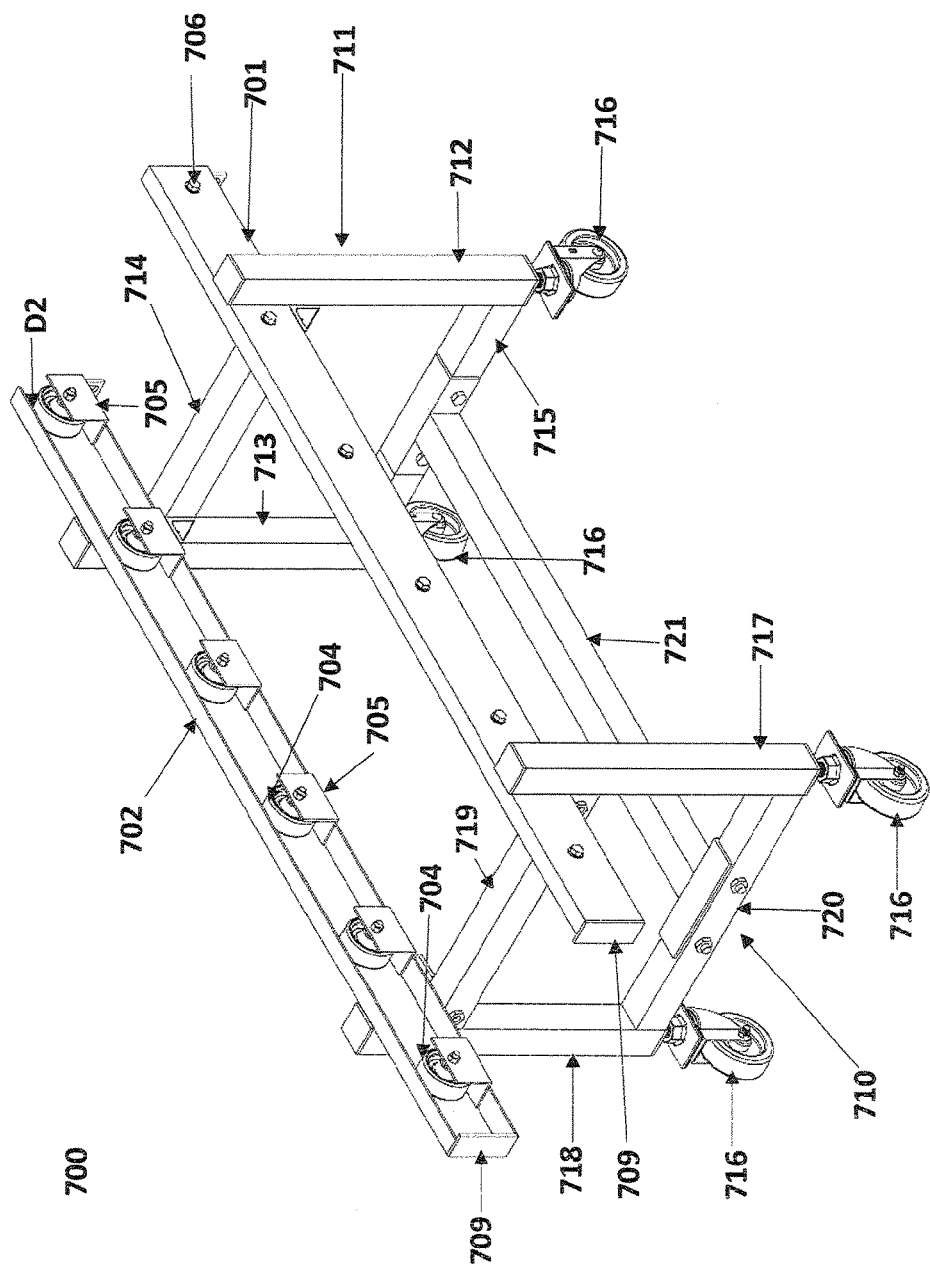
FIG. 8 shows a rear isometric perspective view of the handling device that forms part of the supply and replacement system of the electric vehicle battery bank of the present invention.

FIG. 8 illustrates a rear side perspective view of the handling device that forms part of the supply and replacement system in the electric vehicle battery bank of the present invention. The handling device (700) consists of a metal movable base comprising a left rail (702) and a right rail (701), wherein each rail comprises a series of wheels (704) attached to a wheel angle base (705) by fastening means such as screw (706) and nut (707), each wheel angle base (705) is attached to the inner bottom surface of each rail (701) and (702) preferably by electric welding, tungsten or micro-wire, without being limited to one of these; forming an area whereon the battery bank supporting structure (not shown) will slide, which is the distance (D2) that extends between each of the wheels with the inner top surface on the left rail (702) and the inner top surface on the right rail (701). A stop (709) on one of the ends of each of the rails that limits the sliding of the battery bank supporting structure (not shown) on said rails (701) and (702) of the handling device (700).

The rails (701) and (702) of the handling device (700) are mounted on a front structure (711) and a rear structure (710). The front structure (711) consists of two columns (712) and (713) that are joined together by means of a top supporting element (714) and a bottom reinforcement element (715), wherein each of the columns (712) and (713) comprise a wheel (716) at their lower end.

Similarly, the rear structure (710) consists of two columns (717) and (718) that are joined together by means of a top supporting element (719) and a bottom reinforcing element (720), wherein each of the columns (717) and (718) comprise a wheel (716) at their lower end. Said wheels (716) provide mobility to the handling device (700). Therefore, the rails (701) and (702) are mounted on the top supporting elements (714) and (719) corresponding to the front (711) and rear (710) structures, wherein a connecting element (721) is attached to the center of each bottom reinforcement element (720) and (715), connecting the front (711) and back (710) structures in addition to providing reinforcement to the handling device (700).

It is worth mentioning that the dimensions of the metal mounting structure and of the handling device, particularly the rails thereof, must be the same to provide the supply and exchange/replacement of the battery bank in the electric vehicle. The dimensions depend on the number and physical characteristics of the batteries that make up the battery bank.

Figure 9:
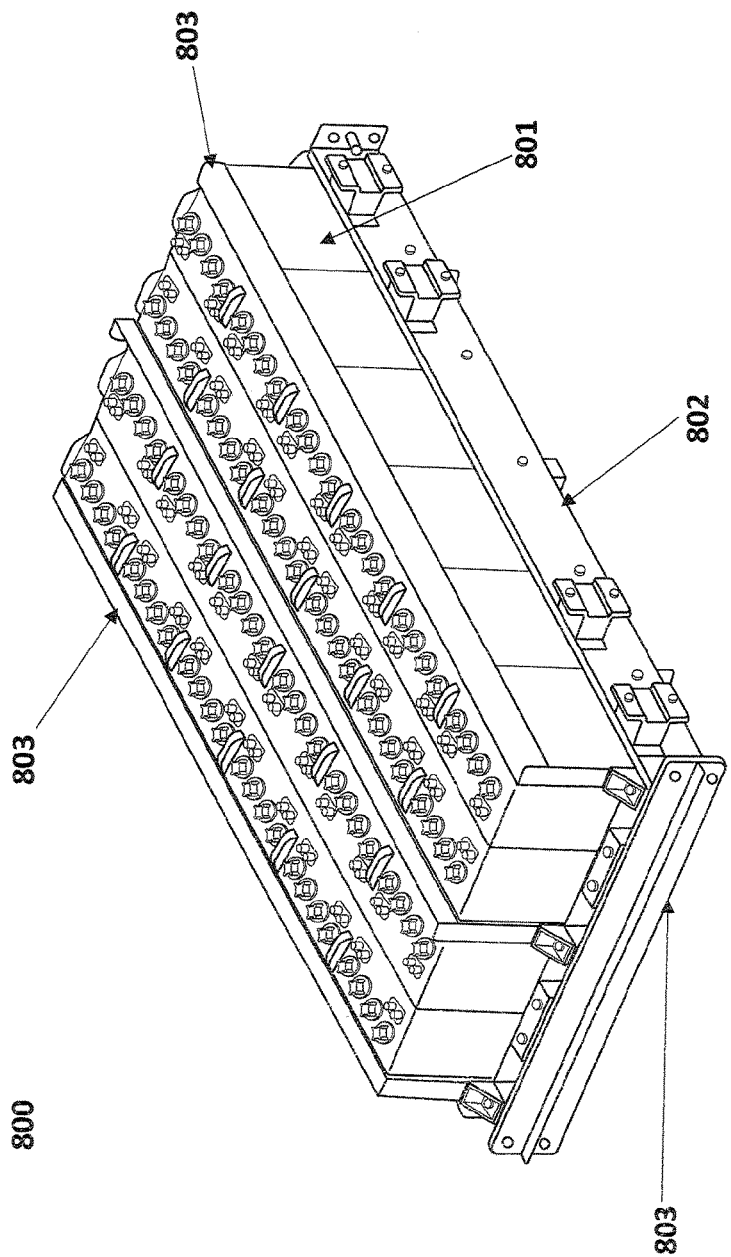
FIG. 9 shows an isometric perspective view of another embodiment of the battery bank.

FIG. 9 shows another side perspective view of another embodiment of the battery bank (800), which consists of twenty-four batteries (801) connected in series, mounted on a supporting structure (802), wherein said batteries are fastened to the structure by fastening means (803) arranged on the sides and in the center of the battery bank (800).

Figure 10:
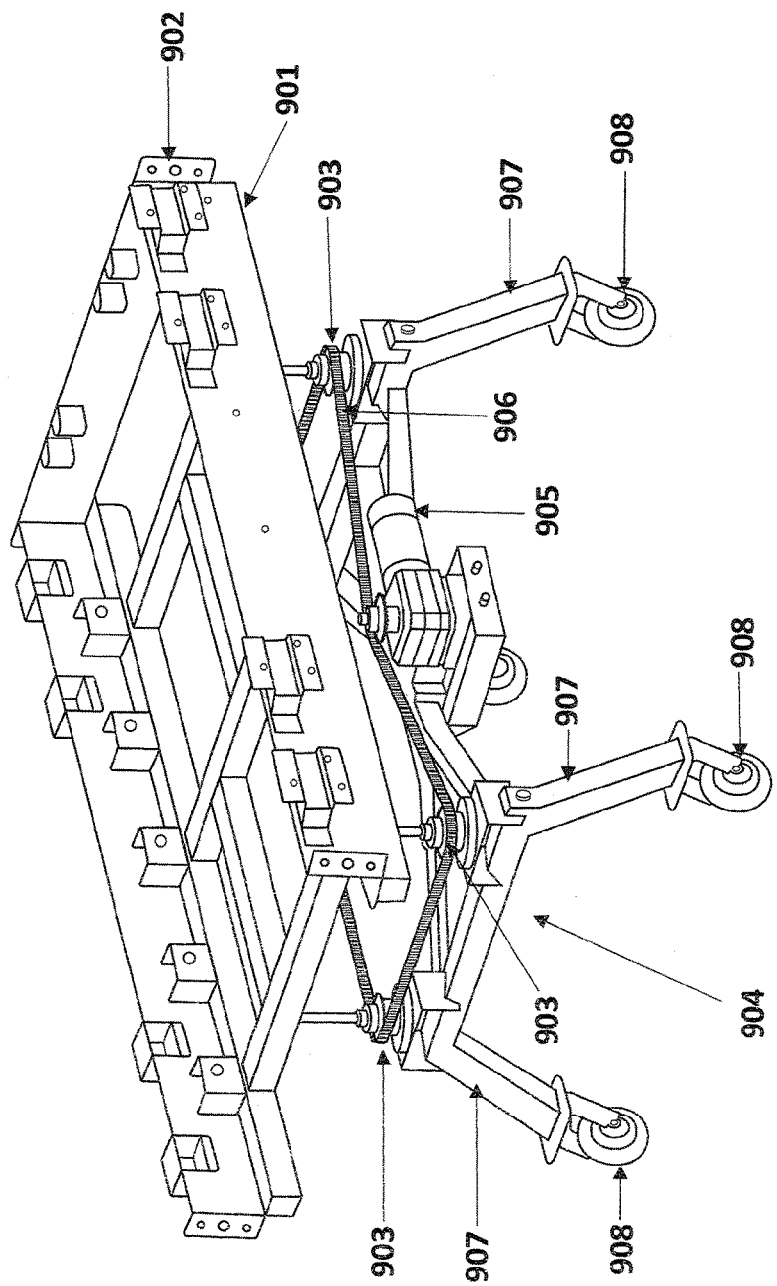
FIG. 10 shows a rear isometric perspective view of an alternative embodiment of the handling device related to the embodiment of the battery bank referred to in FIG. 9.

FIG. 10 shows a rear isometric perspective view of an alternative embodiment of the handling device related to the embodiment referred to in the FIG. 9. The handling device (900) consists of a structural base (901) composed of a pair of rails and a stop element (902) arranged at the rear ends of each rail in the form of an "X" which is fastened onto four supporting elements (907), wherein each supporting element (907) has at its bottom end a rim (908), which provides mobility to the handling device (900).

It will be appreciated by those skilled in the art having the benefit of the present disclosure, that the system of the present invention which facilitates supply, replacement and transportation of the battery bank is specially designed for the electric vehicle of the present invention. It is to be understood that the description and the figures in the present document are to be construed as illustrative and not limitative, and that they are not intended to be limited to the particular forms and examples described. On the contrary, other modifications, changes, embodiments apparent for those skilled in the art, alternatives, design options, and implementation forms are included, without departing from the spirit and scope thereof, as defined by the following claims. Therefore, the following claims are to be construed to encompass all these additional modifications, changes, alternatives, design options.

The invention claimed is:

1. A battery bank supply and replacement system in an electric vehicle characterized in that it comprises: an electric vehicle for commercial use comprising a three-phase electric motor (105) mechanically coupled to a gearbox (113); an electronic control device (101) having an independent switched-mode power supply, wherein the electronic control device (101) manages and communicates the data of the detected operating variables; at least one sensor for measuring the operating variables of the electric vehicle; a digital dashboard (104) comprising a plurality of measuring instruments relative to the parameters measured by the sensors of the vehicle; a controller (102) manages and controls the operating variables of the electric motor by means of an electronic acceleration module (112); a gearshift (114) for making changes in the speed of the electric vehicle; a metal mounting structure (115) that attaches to the vehicle chassis through fastening means, said metal mounting structure (115) comprising a left rail (502) and a right rail (503) arranged in a parallel and spaced manner relative to each other, forming an area whereon the supporting structure (603) of a removable battery bank (103) slides, wherein each rail comprises a series of wheels (504) attached to a wheel angle base (505) through fastening means;
 a removable battery bank (103) consisting of at least eight batteries (602) connected in a series and/or parallel arrangement, wherein said battery bank (103) is mounted on a supporting structure (603), said battery bank (103) is mechanically coupled to the metal mounting structure (115) of the vehicle;
 a handling device (700) comprising a metal movable base consisting of a left rail (702) and a right rail (701), which form an area whereon the supporting structure (603) of the removable battery bank (103) is displaced and engaged, outside the electric vehicle for transportation and replacement.

2. The battery bank supply and replacement system in an electric vehicle according to claim 1, characterized in that: each rail of the metal mounting structure (115) comprises a series of wheels (504) fastened to a wheel angle base (505) through fastening means; wherein each wheel angle base is attached to the inner bottom surface of each rail (502) and (503).

3. The battery bank supply and replacement system in an electric vehicle according to claim 1, characterized in that: the metal mounting structure (115) comprises a stop (509) that confines the distance between the left rail (502) and the right rail (503), in addition to limiting the sliding and coupling of the battery bank supporting structure (603) in the metal mounting structure (115).

4. The battery bank supply and replacement system in an electric vehicle according to any of the preceding claims, characterized in that: each of the left (502) and right (503) rails of the metal mounting structure (115) comprise at least one pair of fastening means (508) which are attached or welded on the bottom outer surface of each rail to attach the metal mounting structure to the electric vehicle chassis.

5. The battery bank supply and replacement system in an electric vehicle according to claim 1, characterized in that: each wheel (504) is mounted on the respective rail (502) or (503) by means of a screw (506) and a nut (507), wherein each screw (506) passes through the rail and the wheel angle base (505), which serves as a rotation axis for the respective wheel (504).

6. The battery bank supply and replacement system in an electric vehicle according to claim 4, characterized in that: the fastening means for each of the left (502) and right (503) rails of the metal mounting structure (115) comprise at least one hole (508) for fastening the metal mounting structure to the electric vehicle chassis.

7. The battery bank supply and replacement system in an electric vehicle according to claim 1, characterized in that: the batteries (602) that make up the removable battery bank (103) are attached to the supporting structure (603) through at least one fastening means (601).

8. The battery bank supply and replacement system in an electric vehicle according to claim 1, characterized in that: the supporting structure (603) is sized according to the size and number of batteries, wherein said supporting structure (603) comprises a pair of side flanges (605) which are inserted into the rails of the metal mounting structure (115) of the electric vehicle, for sliding and attachment, maintaining the removable battery bank (103) fixed on the electric vehicle without unwanted vibrations or displacement.

9. The battery bank supply and replacement system in an electric vehicle according to claim 1, characterized in that: the removable battery bank (103) further comprises a pair of connectors (606) to facilitate its connection or disconnection with the electrical system of the vehicle.

10. The battery bank supply and replacement system in an electric vehicle according to claim 1, characterized in that: each left (701) and right (702) rail of the handling device (700) comprises a series of wheels (704) fastened to a wheel angle base (705) through fastening means; wherein each wheel angle base (705) is attached at the inner bottom surface of each rail (701) and (702) through welding.

11. The battery bank supply and replacement system in an electric vehicle according to claim 10, characterized in that: each wheel (705) is mounted on the respective rail (701) or (702) by means of a screw (706) and a nut (707), wherein each screw (706) passes through the rail (701) or (702) and the wheel angle base (705), which serves as a rotation axis for the respective wheel (504).

12. The battery bank supply and replacement system in an electric vehicle according to claim 1, characterized in that: the handling device (700) further comprises a stop (709) at one end of each left and right (702) rail (701), which limits the sliding of the supporting structure (603) of the removable battery bank (103) on said rails (701) and (702), when the removable battery bank (103) is removed from the metal mounting structure (115) of the electric vehicle.

13. The battery bank supply and replacement system in an electric vehicle according to claim 1, characterized in that: the rails (701) and (702) of the handling device (700) are mounted on a front structure (711) and a rear structure (710), wherein the front structure (711) consists of two columns (712) and (713) which are joined together by a top supporting element (714) and a bottom reinforcement element (715), wherein each of the columns (712) and (713) comprises at its lower end a wheel (716) that provides mobility to the handling device (700).

14. The battery bank supply and replacement system in an electric vehicle according to claim 13, characterized in that: the rear structure (710), consists of two columns (717) and (718) which are joined together by an top supporting element (719) and a bottom reinforcement element (720), wherein each of the columns (717) and (718) comprise at their lower end a wheel (716) that provides mobility to the handling device (700).

15. The battery bank supply and replacement system in an electric vehicle according to claim 13, characterized in that: the rails (701) and (702) of the handling device (700) are mounted on the top supporting elements (714) and (719) corresponding to the front (711) and rear (710) structures, wherein a connecting element (721) is attached to the center of each bottom reinforcement element (720) and (715), connecting the front (711) and rear (710) structures in addition to providing reinforcement to the handling device (700).

16. The battery bank supply and replacement system in an electric vehicle according to claim 1, characterized in that: the dimensions of the space between the left (502) and right (503) rails of the metal mounting structure (115) and the dimensions of the space between the left (701) and right (702) rails of the handling device (700) are the same, wherein said dimensions depend on the number and physical characteristics of the batteries (602) that make up the removable battery bank (603).

17. An electric vehicle for commercial use characterized in that it comprises: a three-phase electric motor (105) mechanically coupled to a gearbox (113); an electronic control device (101) having an independent switched-mode power supply, wherein the electronic control device (101) manages and communicates the data of the detected operating variables; at least one voltage sensor (124) that measures battery bank (103) voltage; at least one current sensor (125) that measures the current consumption of said battery bank (103); at least one temperature sensor (126) that measures a motor (105) temperature; at least one acceleration sensor (127) that measures the acceleration variables of the vehicle; a braking system comprising at least one vacuum sensor (129) which activates a vacuum pump (107) for smooth and safe braking; a digital dashboard (104) comprising a plurality of measuring instruments relative to the parameters measured by the sensors of the vehicle; a controller (102) manages and controls the operating variables of the electric motor by means of an electronic acceleration module (112); a gearshift (114) for making changes in the speed of the electric vehicle; a cargo bay, a metal mounting structure (115) that attaches to the vehicle chassis through fastening means, said metal mounting structure (115) comprises a left rail (502) and a right rail (503) arranged in parallel to and spaced apart from each other, forming an area where on the supporting structure (603) of a removable battery bank (103) slides, wherein each rail comprises a series of wheels (504) attached to an wheel angle base (505) by fastening means; a removable battery bank (103) consisting of at least eight batteries (602) connected in a series and/or parallel arrangement, wherein said battery bank (103) is mounted on a supporting structure (603), said battery bank (103) is mechanically coupled to the metal mounting structure (115) of the vehicle.

18. The electric vehicle for commercial use according to claim 17, characterized in that: the independent switched-mode power supply of the electronic control device (101) is highly efficient.

19. The electric vehicle for commercial use according to claim 17, characterized in that: the plurality of measuring instruments of the dashboard display the speed of the electric vehicle, motor temperature, as well as an audible alarm.

20. The electric vehicle for commercial use according to claim 17, characterized in that: the plurality of measuring instruments of the dashboard display the charge level of the removable battery bank and a series of visual alarms.

21. The electric vehicle for commercial use according to claim 17, further comprising: a pair of mechanical switches (121) that are each arranged in the electric vehicle chassis to detect the cab door status.

22. The electric vehicle for commercial use according to claim 17, further comprising: a mechanical switch (122) that is mounted on the cargo bay of the vehicle to detect the cargo bay door status.

23. The electric vehicle for commercial use according to claim 17, characterized in that: the braking system comprising a vacuum pump, a handbrake lever, a vacuum pump (107) that assists the vacuum servo booster and the vacuum sensor (129) detecting the vacuum generated in the tank or reservoir (118).

24. The electric vehicle for commercial use according to claim 17, further characterized in that it comprises: an auxiliary battery (106) for supplying all the cab systems, lights and the vacuum pump (107) that assists the vacuum servo booster of the braking system.

25. The electric vehicle for commercial use according to claim 17 further characterized in that it comprises an inertial cut-off switch (116) that "opens" the circuit in the event of a collision, preventing the flow of energy to deactivate the operation of the electric vehicle.

26. The electric vehicle for commercial use according to claim 17, further characterized in that it comprises: an SCR type charger (109), which controls the state of the batteries (602) based on the current demand by means of equalization and float stage, in an electronic manner.

27. The electric vehicle for commercial use according to claim 17, further characterized in that it comprises: an electronic acceleration module (112) that operates mechanically in connection with the controller (102), through which the acceleration of the electric vehicle is controlled.

28. The electric vehicle for commercial use according to claim 17, characterized in that: the controller (102) converts the 96 volts of direct current supplied by the battery bank (103) to a three-phase alternating current variable voltage that feeds the electric motor (105), whereby said controller (102) manages and controls the operating variables of the electric motor such as: revolutions per minute, torque, limits of current consumption, motor acceleration and operation based on the detected motor temperature, by means of a previously established control logic.

29. The electric vehicle for commercial use according to claim 17, characterized in that: the dashboard (104) works in conjunction with the electronic control device (101) and the controller (102) through wired connection means.

30. The electric vehicle for commercial use according to claim 17, characterized in that: the handbrake lever comprises a mechanism and a mechanical switch (123) mounted on said mechanism to detect the handbrake lever status.

31. The electric vehicle for commercial use according to claim 17, characterized in that: the voltage sensor (124), the current sensor (125), the temperature sensor (126), the acceleration sensor (127) and the vacuum sensor (129) comprise an electrical communication with the electronic control device (101) which manages and communicates the data of the variables detected during the operation of the electric vehicle.

32. The electric vehicle for commercial use according to claim 17, characterized in that: the gearbox (113) of the vehicle is adjusted at a speed and through a selector button (117) that moves to forward, neutral or reverse, reversing the polarity of the motor, if the selector button (117) is in the neutral position, it sends information to the electronic control device (101) so that the vehicle does not move even if the accelerator pedal is pressed or all the safety conditions have been met, if the selector button (117) is pressed to forward, a signal is sent to the electronic control device (101) so that the truck can move forward, wherein the engine rotation is constantly monitored to ensure that the motor does not change direction until it has come to a complete stop and the revolutions per minute are zero and the selector button has been pressed to reverse.

* * * * *